(12) United States Patent
Holzwarth et al.

(10) Patent No.: US 7,300,585 B1
(45) Date of Patent: Nov. 27, 2007

(54) METHOD OF TREATMENT OF EFFLUENT STREAM

(75) Inventors: Thomas R. Holzwarth, Greenwood, IN (US); Bashir Samuel, Indianapolis, IN (US)

(73) Assignee: Mays Chemical Company, Inc., Indianapolis, IN (US)

( * ) Notice: Subject to any disclaimer, the term of this patent is extended or adjusted under 35 U.S.C. 154(b) by 80 days.

(21) Appl. No.: 11/182,349

(22) Filed: Jul. 15, 2005

Related U.S. Application Data

(60) Provisional application No. 60/588,246, filed on Jul. 15, 2004.

(51) Int. Cl.
*C02F 1/56* (2006.01)

(52) U.S. Cl. .................. 210/666; 210/669; 210/725; 210/727

(58) Field of Classification Search .............. 210/666, 210/669, 725, 727
See application file for complete search history.

(56) References Cited

U.S. PATENT DOCUMENTS

| | | | | |
|---|---|---|---|---|
| 3,912,625 | A | | 10/1975 | Case et al. .................. 210/673 |
| 4,007,115 | A | * | 2/1977 | Howe ......................... 210/665 |
| 4,125,465 | A | | 11/1978 | Turovshy et al. ........... 210/710 |
| 4,198,299 | A | | 4/1980 | Ewing et al. ............... 210/784 |
| 4,200,695 | A | | 4/1980 | Chong et al. ................ 521/28 |
| 4,303,533 | A | | 12/1981 | Fremont ..................... 210/791 |
| 4,310,424 | A | | 1/1982 | Fremont et al. ............ 210/791 |
| 4,340,487 | A | | 7/1982 | Lyon ......................... 210/705 |
| 4,609,469 | A | | 9/1986 | Keoteklian ................. 210/609 |
| 4,770,788 | A | | 9/1988 | Vignola ..................... 210/670 |
| 5,223,144 | A | * | 6/1993 | Woyciesjes et al. ........ 210/664 |
| 5,288,737 | A | | 2/1994 | Krieger .................... 210/195.1 |
| 5,385,646 | A | | 1/1995 | Holiday ....................... 203/11 |
| 5,423,981 | A | | 6/1995 | Krieger .................... 210/195.1 |
| 5,451,324 | A | | 9/1995 | Gehin et al. ................ 210/668 |
| 5,454,955 | A | * | 10/1995 | Albrecht et al. ............ 210/705 |

(Continued)

OTHER PUBLICATIONS

"Water & Wastewater Chemicals", Cytec Industries Inc. 2001, 4 pages.

(Continued)

*Primary Examiner*—Peter A. Hruskoci
(74) *Attorney, Agent, or Firm*—Barnes & Thornburg LLP

(57) ABSTRACT

A method for treating an effluent stream containing material which it is desired to remove from the effluent stream comprises treating the effluent stream with a solution of an acid and a first polymer to reduce the pH of the thus-treated stream to a range of about 5.5 to about 6.5 and to form a precipitate, treating the thus-treated stream with a second polymer to flocculate the precipitate, filtering the thus-treated effluent to remove the flocculated precipitate, treating the filtered effluent with at least one of a cationic resin, an anionic resin and carbon filtration, and discharging the resultant stream into a public waste treatment facility. Another method for treating an effluent stream having a pH in the range of about pH 2 to about pH 6.5 containing material which it is desired to remove from the effluent stream comprises treating the effluent stream with a solution of acid and hydrated polymer to form a precipitate, filtering the precipitate, collecting the filtered solids, disposing of the filtered solids, passing the resulting filtrate through at least one of an anionic exchange device, a cationic exchange device and a carbon filter, and discharging the resultant stream into a public waste treatment facility.

7 Claims, 3 Drawing Sheets

U.S. PATENT DOCUMENTS

| | | | |
|---|---|---|---|
| 5,641,407 A | 6/1997 | Xiong | 210/710 |
| 5,725,779 A | 3/1998 | Mallon et al. | 210/728 |
| 5,733,462 A | 3/1998 | Mallon et al. | 210/728 |
| 5,738,794 A | 4/1998 | Mallon et al. | 210/728 |
| 5,830,364 A | 11/1998 | Bleakley | 210/712 |
| 5,885,032 A | 3/1999 | Mallon et al. | 405/264 |
| 5,889,097 A | 3/1999 | Mallon et al. | 524/236 |
| 5,948,275 A | 9/1999 | Djafer et al. | 210/762 |
| 5,985,992 A | 11/1999 | Chen | 524/814 |
| 6,013,708 A | 1/2000 | Mallon et al. | 524/156 |
| 6,040,376 A | 3/2000 | Mallon et al. | 524/547 |
| 6,059,978 A * | 5/2000 | Pacifici et al. | 210/727 |
| 6,221,956 B1 | 4/2001 | Chen | 524/814 |
| 6,228,283 B1 * | 5/2001 | Turcotte et al. | 252/76 |
| 6,245,121 B1 | 6/2001 | Lamy et al. | 71/1 |
| 6,254,779 B1 | 7/2001 | Jeffery et al. | 210/620 |
| 6,270,677 B1 | 8/2001 | Gopal et al. | 210/696 |
| 6,280,630 B1 | 8/2001 | Ramsay | 210/711 |
| 6,325,936 B1 * | 12/2001 | Niijima | 210/626 |
| 6,440,307 B1 | 8/2002 | Philip et al. | 210/617 |
| 6,471,874 B2 | 10/2002 | Yamamoto et al. | 210/748 |
| 6,573,336 B1 | 6/2003 | Inagaki et al. | 525/333.5 |
| 6,635,182 B1 | 10/2003 | Coleman, Jr. | 210/705 |
| 6,733,662 B2 | 5/2004 | Pollack | 210/97 |
| 6,793,823 B2 | 9/2004 | Hubenthal et al. | 210/623 |
| 6,797,183 B1 | 9/2004 | Fyson | 210/759 |
| 2003/0160002 A1 | 8/2003 | Inagaki et al. | 210/723 |
| 2003/0164331 A1 | 9/2003 | Ingeric | 210/626 |
| 2004/0026317 A1 | 2/2004 | Hubenthal et al. | 210/624 |
| 2004/0050796 A1 | 3/2004 | Coleman, Jr. | 210/705 |

OTHER PUBLICATIONS

"Water Treating Chemicals", Cytec.com, Cytec Industries Inc., 2003, 2 pages.

"SUPERFLOC® coagulants, Liquid, Resin Amine, cationic: C-500 Series", Cytec Industries Inc., 1997, 2 pages.

"Floculants SUPERFLOC®, Polyacrylamide (PAM) cationique en emulsion: Serie SD 2000", Cytec Industries Inc. 1998, 2 pages.

* cited by examiner

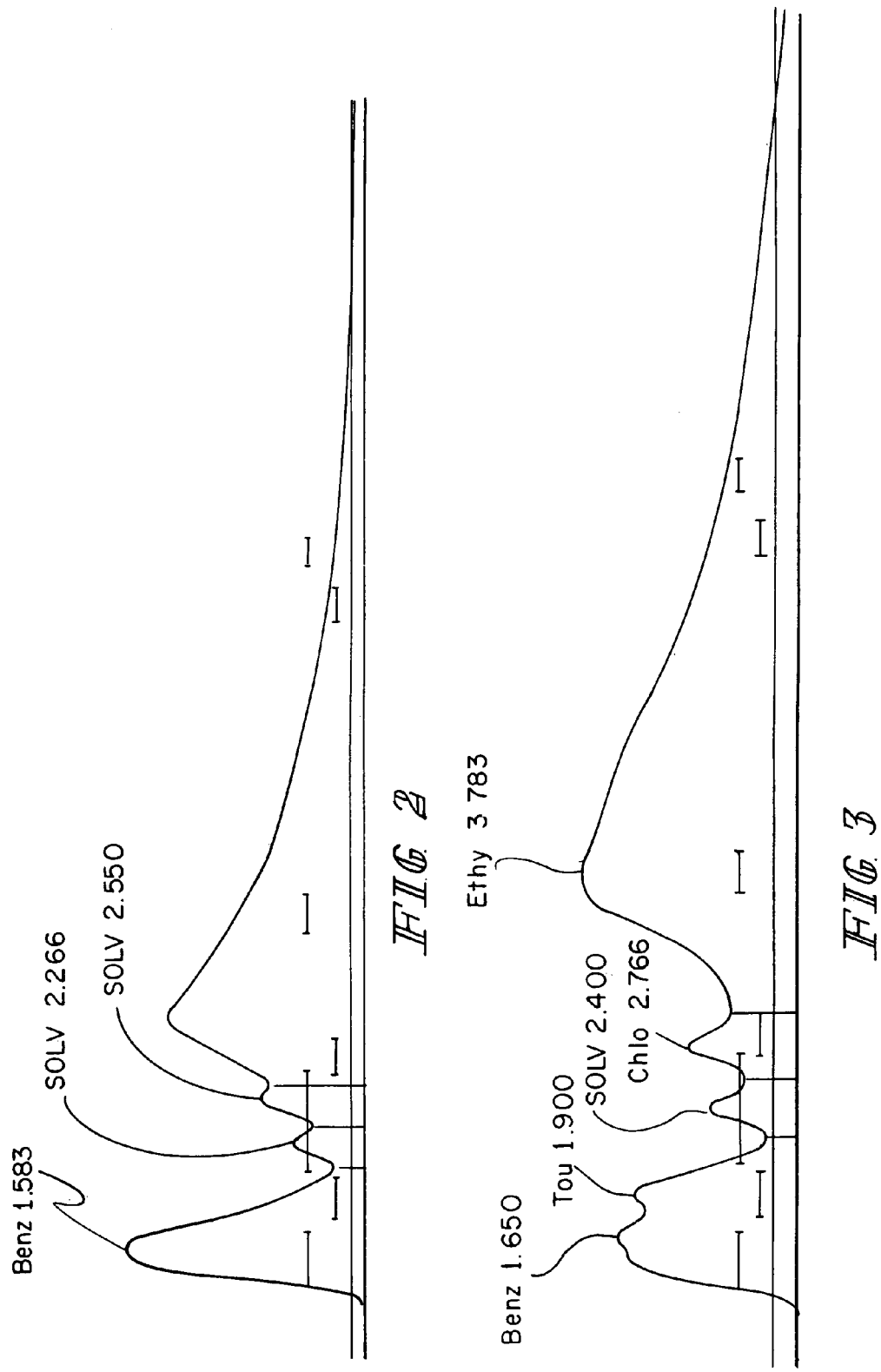

METHOD OF TREATMENT OF EFFLUENT STREAM

CROSS-REFERENCE TO RELATED APPLICATIONS

This regular utility patent application claims priority under 35 U.S.C. § 119(e) to U.S. Ser. No. 60/588,246, filed Jul. 15, 2004, the entire disclosure of which is hereby incorporated herein by reference.

FIELD OF THE INVENTION

This invention relates to the treatment of effluent streams to neutralize hazardous and/or otherwise environmentally undesirable constituents of such streams.

BACKGROUND OF THE INVENTION

The invention is disclosed in the context of a method for treating wastewater from industrial processes, which wastewater contains, for example, organic material classified under the Resource Conservation and Recovery Act (RCRA), with the objective of sufficiently neutralizing harmful constituents so that the treated effluent can be safely discharged into, for example, publicly owned treatment works (POTW). However, it is believed to be useful in other applications as well. The described method provides an effective way to dewater and concentrate organic and inorganic contaminants. The described method produces a wastewater stream that is substantially free or organic and inorganic contaminants and thus suitable for discharge into a municipal POTW without adverse effects on the municipal treatment processes. The solid waste generated from the described method represents a significant reduction of overall waste volume.

A number of methods and apparatus have been proposed for the treatment of effluent streams. Among them are the methods and apparatus illustrated and described in the following listed U.S. Pat. Nos. 3,836,461; 3,912,625; 4,125,465; 4,198,299; 4,200,695; 4,303,533; 4,310,424; 4,609,469; 4,340,487; 4,770,788; 5,288,737; 5,385,646; 5,423,981; 5,641,407; 5,451,324; 5,641,407; 5,451,324; 5,830,364; 5,948,275; 6,245,121; 6,254,779; 6,270,677; 6,280,630; 6,440,307; 6,471,874; 6,573,336; 6,635,182; 6,733,662; US2003/0160002; US2003/0164331; 6,793,823; 6,797,183; US2004/0026317; and, US2004/0050796. Also of interest are the disclosures of the following listed U.S. Pat. Nos. 5,725,779; 5,733,462; 5,738,794; 5,885,032; 5,889,097; 5,985,992; 6,013,708; 6,040,376; and, 6,221,956. The disclosures of all of the above-noted references are hereby incorporated herein by reference. This listing is not intended to be a representation that a complete search of all relevant art has been made, or that no more pertinent art than that listed exists, or that the listed art is material to patentability. Nor should any such representation be inferred.

DISCLOSURE OF THE INVENTION

According to an aspect of the invention, a method is provided for treating an effluent stream containing material which it is desired to remove from the effluent stream. The method comprises treating the effluent stream with a solution of an acid and a first polymer to reduce the pH of the thus-treated stream to a range of about 5.5 to about 6.5 and to form a precipitate, treating the thus-treated stream with a second polymer to flocculate the precipitate, filtering the thus-treated effluent to remove the flocculated precipitate, treating the filtered effluent with at least one of a cationic resin, an anionic resin and carbon filtration, and discharging the resultant stream into a public waste treatment facility.

Illustratively according to this aspect of the invention, treating an effluent stream containing material which it is desired to remove from the effluent stream comprises treating an effluent stream having a pH in the range of about 11.5 to about 12.5.

Illustratively according to this aspect of the invention, treating the effluent stream with a solution of an acid and a first polymer comprises treating the effluent stream with a solution of about 0.1N to about 1.0N hydrochloric acid and the first polymer.

Illustratively according to this aspect of the invention, treating the thus-treated stream with a second polymer to flocculate the precipitate comprises treating the thus-treated stream with a second water-soluble polymer.

Illustratively according to this aspect of the invention, filtering the thus-treated effluent to remove the flocculated precipitate comprises passing the thus-treated stream through a filter cloth.

According to another aspect of this invention, a method is provided for treating an effluent stream containing material which it is desired to remove from the effluent stream. The method comprises treating the effluent stream with a solution of acid and hydrated polymer to reduce the pH of the thus-treated stream to a range of about 2 to about 6.5 and to form a precipitate, filtering the precipitate, collecting the filtered solids, disposing of the filtered solids, passing the resulting filtrate through at least one of an anionic exchange device, a cationic exchange device and a carbon filter, and discharging the resultant stream into a public waste treatment facility.

Further illustratively according to this aspect of the invention, the method comprises treating an effluent stream containing material which it is desired to remove from the effluent stream having a pH in the range of about 11.5 to about 12.5 with dilute solution of acid and hydrated polymer to form the effluent stream having a pH in the range of about pH 2 to about pH 6.5.

Illustratively according to this aspect of the invention, treating an effluent stream containing organic material with a solution of acid and hydrated polymer comprises treating an effluent stream containing organic material with a solution of 0.1N to 1.0N hydrochloric acid and hydrated polymer.

Illustratively according to this aspect of the invention, filtering the precipitate from the effluent stream comprises filtering the precipitate from the effluent stream in a filter cloth of a gauge suitable to filter out the precipitate.

BRIEF DESCRIPTIONS OF THE DRAWINGS

The invention may best be understood by referring to the following detailed description and accompanying drawings which illustrate the invention. In the drawings:

FIG. 2 illustrates a high-pressure liquid chromatograph (hereinafter HPLC) of a sample from an effluent stream containing organic materials classified under the RCRA, prior to treatment by a method according to the invention;

FIG. 3 illustrates an HPLC of a sample from an effluent stream used to make the HPLC of FIG. 2 after further treatment according to the invention;

DETAILED DESCRIPTIONS OF ILLUSTRATIVE EMBODIMENTS

Generally, a process conducted according to the invention involves the utilization of various vessels to achieve contact with the waste water effluent. This contact aids in the removal of organic contaminants from the effluent and effectively produces a water effluent that is suitable for discharge to a municipal wastewater treatment facility. Solid wastes, which are significantly reduced in volume, may then be treated in a hazardous waste landfill or through incineration.

Figure 1:
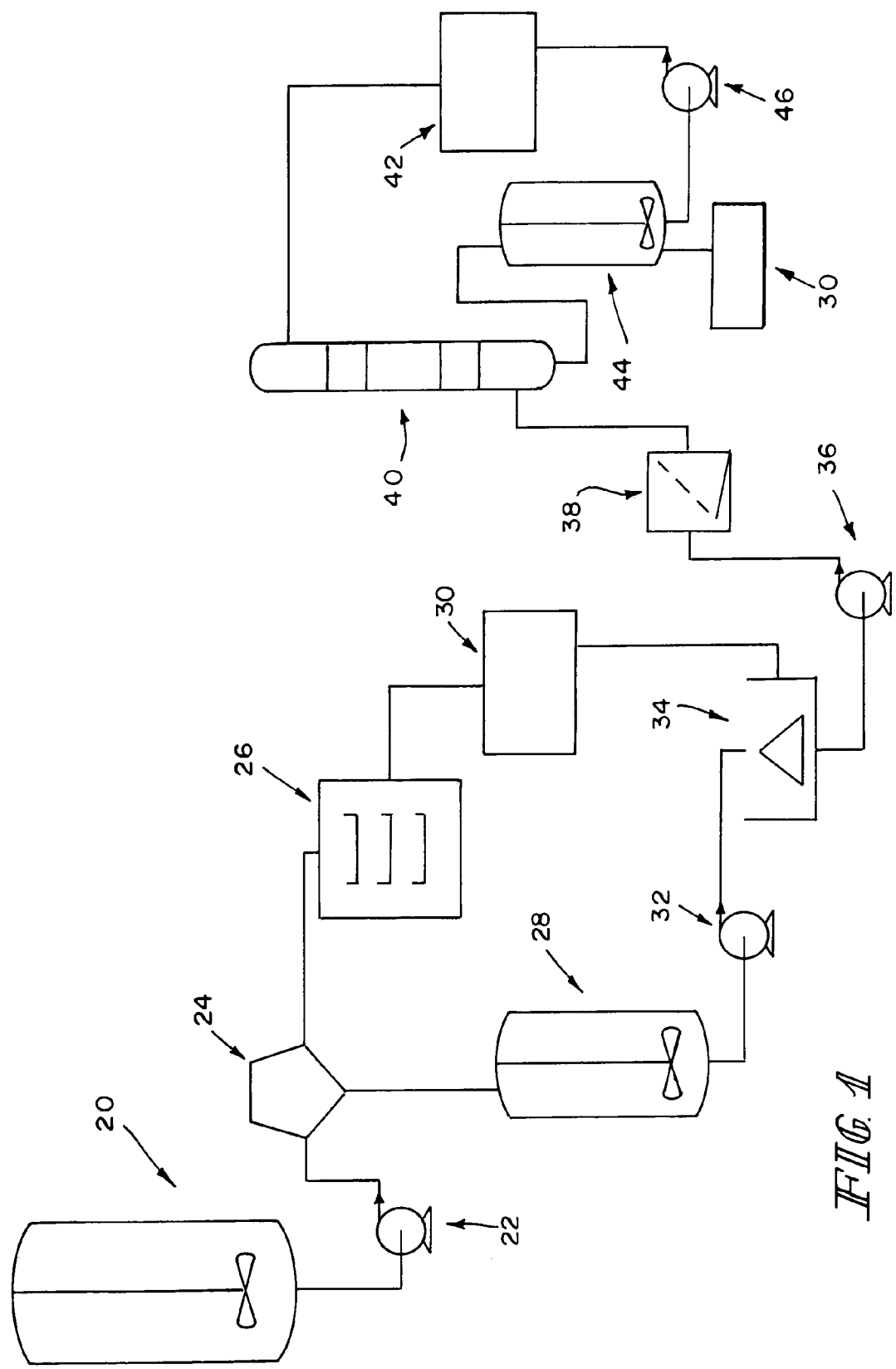
FIG. 1 illustrates a partly block and partly schematic diagram of a water treatment process flow utilizing the invention.

Referring to FIG. 1, a treatment facility for treating an effluent stream containing organic materials classified under the RCRA includes a mixer 20 in which the effluent stream is treated on a batch basis with an acid resin amine. After treatment in mixer 20, the batch is pumped by a pump 22 to a solid-liquid extraction device 24, such as a belt filter press, where solids are filtered out and conveyed to a dryer 26. The liquid from solid-liquid extraction device 24 is conveyed to a mixer 28 in which its pH is adjusted and cations are exchanged. The dried solids from dryer 26 are transported 30 to a solid waste landfill or to an incinerator. The treated liquid from mixer 28 is pumped by a pump 32 to a solid/liquid separator 34, such as a centrifuge or belt press. Solids from this separation are transported 30 to a solid waste landfill or incinerator. The liquid from this separation 34 is pumped by a pump 36 through a carbon filter 38 to anionic exchange and/or cationic exchange column 40. The effluent which passes through the exchange column 40 may be discharged into the POTW 42. Effluent trapped in the exchange column 40 is conveyed to a mixer 44 for neutralization and settlement, followed by discharge via pump 46 of the liquid into the POTW 42 and transport 30 of the solid waste to a landfill or incinerator.

EXAMPLE 1

A solution of dilute, for example, 0.1N to 1.0N, hydrochloric acid in a polymer solution was added at 20 to an effluent stream containing organic materials classified under the RCRA. In this example, the untreated effluent stream had a pH in the range of 11.5 to 12.5. The pH of the thus-treated stream had a pH in a range of about 5.5 to 6.5. As a result of the addition of the acid/polymer solution, various organic and inorganic contaminants precipitated out 24 of the effluent stream. The thus-treated precipitate/effluent stream was then treated 28 with a second water-soluble polymer to flocculate the precipitate. The flocculated precipitate was removed 34 by passing the treated effluent through belt filter press cloth. The gauge of the cloth was determined by the size of the precipitate flock. The size of the precipitate flock may vary from quite fine to relatively coarse, but in this example was about cottage cheese curd size.

The filtered effluent can subsequently be treated 40 as necessary or desirable with cationic and/or anionic resins, for example, of the type found in water softener exchange resins, and/or by carbon filtration 38, for example, treatment with activated carbon, prior to discharge to municipal POTW 42.

A typical acid/polymer solution is Cytec Industries Inc., Superfloc® C 515 coagulant. A typical water-soluble polymer is Cytec Industries Inc., Superfloc® SD 2081 coagulant.

Typical organic and inorganic materials that can be removed by this process include, but are not limited to: sodium nitrite, sodium nitrate and any other sodium salts, such as sodium halides, sodium hydroxide, potassium hydroxide and the like; nitro-N-methylpthalimide; bisphenol-A; bisphenol-A-monoimide acid; bisimide; 3,4-nitrophthalic acid and derivatives thereof; 3,4-nitrophthalimide-N-methyl amide; other aromatic acids and imides; and, organic and inorganic acids.

EXAMPLE 2

A wastewater effluent is pH adjusted to a range of pH 2 to pH 6.5 using a solution of dilute acid with a hydrated polymer 28. At the proper pH, a precipitate is formed. The precipitate is then filtered 34 from the effluent stream via any suitable means, such as, for example, a belt filter press having cloth of a gauge suitable to filter out the resulting precipitate and solid salts which are then collected for disposal 30. The resulting filtrate is then passed 40 through anionic exchange and/or cationic exchange and/or activated carbon column 38 to produce water suitable for discharge into POTW 42.

Figures 4, 5:
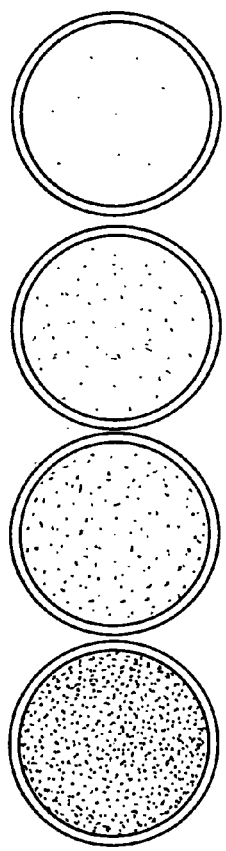
FIG. 4 illustrates an HPLC of a sample from an effluent stream used to make the HPLCs of FIGS. 2-3 after further treatment according to the invention; and, FIG. 5 illustrates waste water effluent at various stages in a process conducted in accordance with the present invention.

HPLC analysis of several stages in the process is illustrated in the chromatograms of FIGS. 2-4. All chromatograms are performed using a Waters analytical HPLC (http://www2.waters.com/watprod.nsf/websearchProduct?Openform&ref-JDRS-5SBP6M) equipped with a C18 column; the mobile phase is a solution of 60% methanol in distilled water.

Prior to treatment the sample at the far left in FIG. 5 is a opaque reddish brown solution. The HPLC analysis illustrated in FIG. 2 showed significant organic material as evidenced by the tailing peaks and multiple absorbance peaks.

After removal of flocculated solids, the sample clarifies as illustrated second from the left in FIG. 5, and is a reddish orange color. The HPLC analysis illustrated in FIG. 3 illustrates that substantial organic contaminants are removed upon further treatment.

Treatment of the effluent by carbon filtration 38 and cationic ion-exchange 40 shows further clarification, as illustrated second from the right in FIG. 5. The HPLC analysis illustrated in FIG. 4 shows significant removal of contaminants. This effluent is suitable for discharge to a municipal water treatment facility 42.

Effluent trapped in the exchange column 40 is conveyed to a mixer 44 for neutralization and settlement. The resulting effluent, illustrated at the far right in FIG. 5, is suitable for discharge to a municipal water treatment facility 42.

It is believed that the presence of organic and inorganic contaminants, including mixtures of chaotropic salts, anionic organic salts, and kosmotropic salts, in an acidified wastewater effluent stream decreases the solubility of a first polymer, possibly through an ion-exchange process or something of that nature. It is believed that, in such a process, organic and inorganic contaminant ions may become arrayed on a first polymer, thereby replacing a counter-ion originally present on the polymer. The end result is decreased water-solubility of the thus-substituted polymer, with subsequent or concomitant entrapment of organic and inorganic contaminants, and enhanced precipitation from the wastewater effluent stream.

What is claimed is:

1. A method of treating a wastewater effluent stream having a pH in the range of about 11.5 to about 12.5 containing organic and inorganic contaminant material which it is desired to remove from the effluent stream, the method comprising treating the effluent stream with a solution of an acid and a first polymer to reduce the pH of the thus-treated stream to a range of about 5.5 to about 6.5 and to form a precipitate including said organic and inorganic contaminant material, treating the thus-treated stream with a second polymer to flocculate the precipitate, filtering the thus-treated effluent to remove the flocculated precipitate, treating the filtered effluent with at least one of a cationic resin, an anionic resin and carbon filtration, and discharging the resultant stream into a public waste treatment facility.

2. The method of claim 1 wherein treating the effluent stream with a solution of an acid and a first polymer comprises treating the effluent stream with a solution of about 0.1N to about 1.0N hydrochloric acid and the first polymer.

3. The method of claim 1 wherein treating the thus-treated stream with a second polymer to flocculate the precipitate comprises treating the thus-treated stream with a second water-soluble polymer.

4. The method of claim 1 wherein filtering the thus-treated effluent to remove the flocculated precipitate comprises passing the thus-treated stream through a belt filter press cloth.

5. A method of treating a wastewater effluent stream having a pH in the range of about 11.5 to about 12.5 containing organic and inorganic contaminant material which it is desired to remove from the effluent stream, the method comprising treating the effluent stream with a solution of acid and hydrated polymer to reduce the pH of the thus-treated stream to a range of about 2 to about 6.5 and to form a precipitate including said organic and inorganic contaminant material, filtering the precipitate, collecting the filtered solids, disposing of the filtered solids, passing the resulting filtrate through at least one of an anionic exchange device, a cationic exchange device and a carbon filter, and discharging the resultant stream into a public waste treatment facility.

6. The method of claim 5 wherein treating the effluent stream with a solution of acid and hydrated polymer comprises treating the effluent stream with a solution of 0.1N to 1.0N hydrochloric acid and hydrated polymer.

7. The method of claim 5 wherein filtering the precipitate from the effluent stream comprises filtering the precipitate from the effluent stream in a filter cloth of a gauge suitable to filter out the precipitate.

* * * * *